United States Patent [19]

Rietbergen

[11] 3,754,696

[45] Aug. 28, 1973

[54] CASSETTE RECORDING APPARATUS

[75] Inventor: Wilhelmus Petrus Carolus Rietbergen, Emmasingel, Eindhoven, Netherlands

[73] Assignee: U.S. Philips Corporation, New York, N.Y.

[22] Filed: June 16, 1972

[21] Appl. No.: 263,676

[30] Foreign Application Priority Data

June 25, 1971 Netherlands .......................... 7108766

[52] U.S. Cl. .................. 226/179, 226/188, 226/194, 74/572

[51] Int. Cl. .............................................. B65h 17/22

[58] Field of Search ....................... 226/188, 37, 179, 226/194; 74/572

[56] References Cited

UNITED STATES PATENTS 3,278,099 10/1966 Wada ........................... 226/179 UX 3,602,415 8/1971 Gross ................................ 226/188

*Primary Examiner*—Allen N. Knowles
*Attorney*—Frank R. Trifari

[57] ABSTRACT

Apparatus for recording and/or playing back magnetic recordings on and/or from a recording tape accommodated in a cassette, which apparatus is provided with at least one capstan which is displaceable in the direction of its longitudinal axis between an operative position and a retracted position. A flywheel, which is arranged coaxially with the capstan and serves to drive the capstan, is axially immovably mounted on the outer surface of a fixed sleeve in which the capstan is mounted. In the operative position of the capstan the rotation movement of the flywheel is transmitted to the capstan by means of a dog clutch.

4 Claims, 2 Drawing Figures

CASSETTE RECORDING APPARATUS

Figure 1:
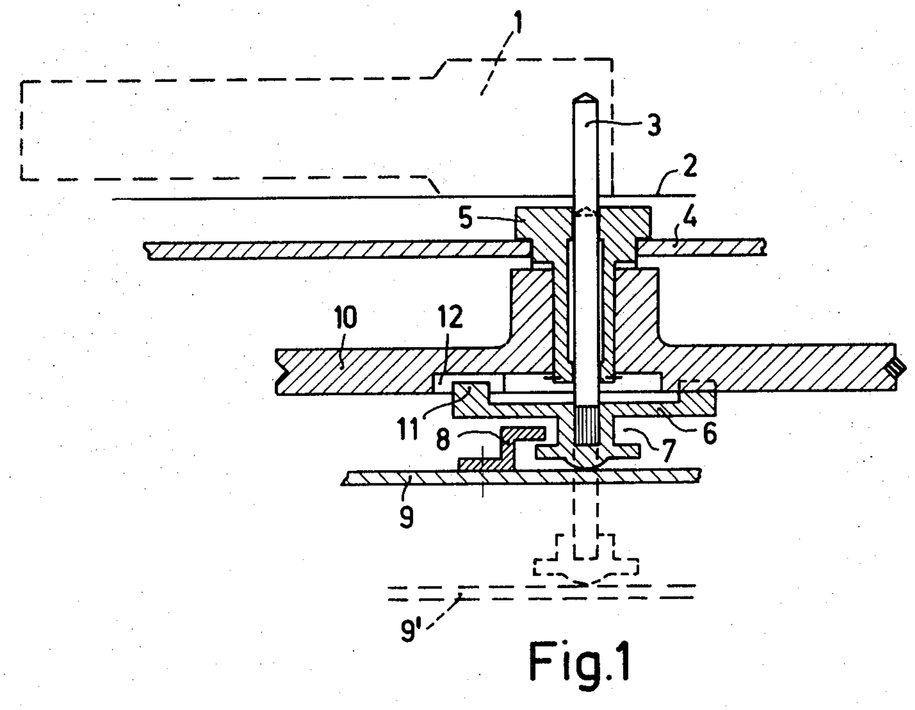

The invention relates to an apparatus for recording and/or playing back magnetic recordings on and/or from a tape-shaped record carrier accommodated in a cassette, which apparatus is provided with at least one capstan which is displaceable in the direction of its longitudinal axis between a position in which it is retracted out of a cassette supporting surface, in which position the cassette can be inserted into the apparatus or be removed from it along the supporting surface, and an operative position in which the capstan extends through the supporting surface into the inserted cassette, whilst for driving the capstan a flywheel is provided which is arranged coaxially with the capstan and is driven by a driving source of the apparatus.

In a known apparatus of this type the capstan and the flywheel are rigidly interconnected, which implies that in order to displace the capstan the flywheel and hence all the driving elements of the apparatus of which the flywheel forms part are to be displaced also. This displacement of all the driving elements requires a given space in the apparatus, and this adversely affects the size of the apparatus and is particularly objectionable if the apparatus is intended to be mounted in the dashboard of a motorcar.

It is an object of the present invention to obivate the said disadvantage, and an apparatus according to the invention is characterized in that the flywheel is mounted so as to be immovable in the axial direction and the capstan is mounted in the flywheel so as to be axially displaceable, coupling members being provided by means of which in the operative position of the capstan the rotation of the flywheel is transmitted to the capstan.

The configuration according to the invention provides the advantage that the flywheel and the associated driving elements of the apparatus can be mounted on a fixed stationary mounting plate of the apparatus and the space which in the known apparatus is required for the displacement of these elements can be used now to accommodate other components, for example electrical components, such as an amplifier stage, so that the overall dimensions of the apparatus are reduced, which renders it particularly suitable to be mounted in the dashboard of a motor-car.

A suitable embodiment of the invention consists in that the coupling members take the form of a dog clutch, the capstan carrying a disc-shaped element which at mutually equal angular distances is provided with projections which are capable of engaging in associated recesses in the flywheel. The use of a dog clutch provides the advantage that only a comparatively small amount of friction is produced in the capstan bearings.

To obtain a particularly compact construction, in a suitable embodiment of the invention the capstan is mounted in a sleeve which is rigidly secured in the apparatus, whilst the flywheel is mounted on the outer surface of the sleeve. The mounting of the axially displaceable capstan must satisfy stringent requirements. To comply with these requirements, according to the invention the inner wall of the sleeve is provided, at least through part of its length, with sawtooth-shaped recesses, whilst the capstan is mounted in the sleeve with interposition of at least one thin-walled bush which is made of a synthetic material and is arranged with a press fit in the sawtooth-shaped recesses in the sleeve.

Figure 2:
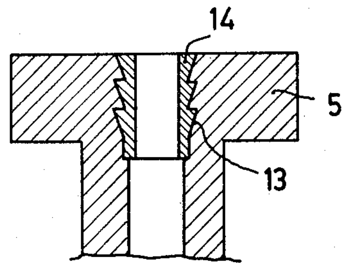

An embodiment of the invention will now be described, by way of example, with reference to the accompanying diagrammatic drawings, in which:

FIG. 1 is a sectional view of that part of an apparatus for recording and/or playing back magnetic recording which is essential to the invention, and FIG. 2 is, on an enlarged scale, a sectional view of part of a bearing bush in which the capstan of the apparatus shown in FIG. 1 is mounted.

The apparatus for recording and/or playing back magnetic recordings on and/or from a tape-shaped record carrier shown is of the type using cassettes in which the tape is accommodated. Such a cassette, which is designated by 1 in FIG. 1, may be inserted into the apparatus or removed from it along a supporting surface 2. FIG. 1 shows the operative position of the apparatus with a cassette 1 inserted. In this position a capstan 3 extends through the supporting surface 2 into the cassette 1.

The apparatus has a fixed mounting plate 4 in which a sleeve 5 is secured. In this sleeve a capstan 3 is mounted so as to be rotatable and axially slidable. A disc-shaped element 6 provided with a groove 7 is secured on the end of the capstan remote from the cassette supporting surface. A bracket 8 engages in the groove 7 at one end and at the other end is secured to a movable mounting plate 9 by means of which the displacement of the capstan is controlled. The mounting plate 9 is movable between a position 9' which is shown by broken lines and in which the capstan has been retracted out of the cassette supporting surface 2, and an operative position which is shown by solid lines and in which the capstan 3 extends through the cassette supporting surface 2 into the cassette 1. In this operative position the capstan cooperates in a known manner, not shown, with a pressure roller for the transport of the recording tape, whilst at least one magnetic head extends through an opening in the cassette to enable magnetic recordings to be recorded on the tape or to be played back from the tape. The movements of the mounting plate 9 and hence of the capstan 3 may be derived in known manner from the movements for insertion and removal of the cassette, but this is not shown, because it is not regarded as essential to the invention.

To drive the capstan into rotation a flywheel 10 is provided which in turn is driven by a driving source, not shown, of the apparatus. The flywheel is mounted on the outer surface of the sleeve 5 so as to be immovable in the axial direction. To enable the rotation of the flywheel 10 to be transmitted to the capstan 3 in the operative position, the disc 6 secured to the capstan is provided with equispaced projections 11 which in the operative position of the capstan engage in associated recesses 12 in the flywheel 10.

In the apparatus according to the invention the bearing in which the rotatable and displaceable capstan is mounted has to satisfy exacting requirements. FIG. 2 shows a suitable embodiment of such a bearing. In this embodiment the inner wall of the sleeve 5 is provided, at least through part of its length, with sawtooth-shaped recesses 13 into which a thin-walled bush 14 made of a synthetic material has been arranged with a press fit.

It should be noted that the invention is not restricted to the aforedescribed embodiment shown in the drawings. The invention may, for example, be used also in apparatus of the type generally referred to as "reverse" apparatus which have two capstans. The invention also includes embodiments in which in addition to the capstan or capstans the winding spindles for driving the spools contained in the cassette are coupled to the movable mounting plate 9 so as to enable them to be axially displaced by means of this plate.

What is claimed is:

1. Apparatus for recording and/or playing back magnetic recordings on and/or from a tape-shaped record carrier accommodated in a cassette, which apparatus is provided with at least one capstan which is displaceable in the direction of its longitudinal axis between a position in which it is retracted out of a cassette supporting surface and in which the cassete can be inserted into the apparatus or be removed therefrom along the supporting surface, and an operative position in which the capstan extends through the supporting surface into the inserted cassette, whilst for driving the capstan a flywheel is provided which is arranged coaxially with the capstan and is driven by a driving source of the apparatus, characterized in that the flywheel is mounted so as to be immovable in the axial direction and the capstan is mounted in the flywheel so as to be axially displaceable, coupling members being provided by means of which the rotation of the flywheel is transmitted to the capstan in the operative position of the capstan.

2. Apparatus as claimed in claim 1, characterized in that the coupling members take form of a dog clutch, the capstan carrying a disc-shaped element which at mutually equal angular distances is provided with projections which are capable of engaging in associated recesses in the flywheel.

3. Apparatus as claimed in claim 1 or claim 2, characterized in that the capstan is mounted in a sleeve which is rigidly secured in the apparatus, whilst the flywheel is mounted on the outer surface of this sleeve.

4. Apparatus as claimed in claim 3, characterized in that the inner wall of the sleeve is provided at least through part of its length with sawtooth-shaped recesses, and the capstan is mounted in the sleeve with interposition of at least one thin-walled bush which is made of a synthetic material and is arranged with a press fit in the sawooth-shaped recesses in the sleeve.

* * * * *